United States Patent [19]
Depelteau et al.

[11] Patent Number: 6,118,764
[45] Date of Patent: Sep. 12, 2000

[54] CONGESTION INDICATION/NO INCREASE (CI/NI) ABR FLOW CONTROL FOR ATM SWITCHES

[75] Inventors: Gary Michael Depelteau; John Edward Vincent; Abdulaziz Almulhem, all of Ottawa, Canada

[73] Assignee: Nortel Networks Corporation, Montreal, Canada

[21] Appl. No.: 09/000,550

[22] Filed: Dec. 30, 1997

[51] Int. Cl.[7] .................................................. G01R 31/08
[52] U.S. Cl. .......................... 370/235; 370/231; 370/232; 370/253
[58] Field of Search .................. 370/231, 232, 370/235, 236, 395, 468, 253

[56] References Cited

U.S. PATENT DOCUMENTS

| | | | |
|---|---|---|---|
| 5,633,859 | 5/1997 | Jain et al. | 370/234 |
| 5,889,761 | 3/1999 | Yamato | 370/231 |
| 5,991,268 | 11/1999 | Awdeh et al. | 370/232 |
| 6,018,518 | 1/2000 | Smallwood et al. | 370/235 |
| 6,021,115 | 2/2000 | Simpson et al. | 370/235 |

FOREIGN PATENT DOCUMENTS

| | | | |
|---|---|---|---|
| WO 9639759 | 12/1996 | WIPO | H04J 1/16 |
| WO 9720415 | 5/1997 | WIPO | H04L 12/56 |

*Primary Examiner*—Chi H. Pham
*Assistant Examiner*—Brenda H. Pham

[57] ABSTRACT

A system and method for updating the congestion indication and no increase values in an resource management cell on an available bit rate connection in an asynchronous transfer mode network. The method determines a per port elastic allocatable rate as a function of a port's capacity, and the current high priority traffic rate. The values are set according to the underutilization or over utilization of the allocated elastic bandwidth.

17 Claims, 3 Drawing Sheets

CONGESTION INDICATION/NO INCREASE (CI/NI) ABR FLOW CONTROL FOR ATM SWITCHES

FIELD OF THE INVENTION

The invention relates to a method of controlling the flow of ATM cells in an ATM network, and to an ATM network switch in which the method is carried out.

BACKGROUND OF THE INVENTION

The ABR (available bit rate) service in ATM (asynchronous transfer mode) networks is intended to make the best use of remaining capacity after higher priority services such as CBR (constant bit rate) and VBR (variable bit rate) have been provided for. ABR employs a closed-loop flow control mechanism based on RM (resource management) cells to allocate and moderate user access to the available bandwidth. The flow control loop can be end-to-end in which case the RM cells travel all the way from source to destination before being looped back, or it can be segmented into smaller control loops with interim switches emulating the behavior of the end systems. Such interim switches are referred to as VS/VD (virtual source/virtual destination) switches. The RM cells provide information regarding the congestion level in the switches in the path and regarding the bandwidth allocated to individual sources. This information is used by the source to modify its transmission rate, the objective being to utilize link capacity fully while not losing any cells as a result of congestion. ABR is not intended for real-time applications, and no guarantees are made with respect to cell delay and cell delay variation.

Each RM cell contains a CI (congestion indication) parameter and an NI (no increase) parameter which may be adjusted as the RM cells pass through the switches in the path in either the forward or backward direction. The CI/NI parameters contained in the RM cell when it returns to the source are used to indicate to the source what type of relative increase or decrease should be effected to the rate at which the source can send cells. More specifically, the source is allowed to send cells at a rate entitled the ACR (allowed cell rate), and it is this ACR which is iteratively adjusted by the source each time it receives a returned RM cell as a function of the CI/NI parameters.

There have been many proposed methods for calculating CI/NI in an ATM switch. See for example U.S. Pat. No. 5,633,859 which issued May 27, 1997 to Jain et al. entitled "Method and Apparatus for Congestion Management in Computer Networks Using Explicit Rate Indication", PCT application PCT/US/19720 published Jun. 5, 1997 to Jones, entitled "Controlled Available Bit Rate Service in an ATM Switch", and PCT application PCT/US96/08906 published Dec. 12, 1996 to Jones entitled "Controlling the Flow of ATM Cells in an ATM Network".

It is not immediately clear that any of the algorithms in the above identified references feature a desired combination of characteristics including fast convergence, fairness of elastic bandwidth allocation between virtual connections (elastic bandwidth being the amount of ABR bandwidth available after accounting for the MCR for all connections), low hardware cost and complexity as well as short processing time, scalability with number of virtual circuits, robust against dishonest sources who lie about their current cell rates, high link utilization, capable of taking other traffic classes into consideration, being easily extendable to support VS/VD (virtual source/virtual destination), and capable of redistributing unused elastic bandwidth as well as unused MCR.

SUMMARY OF THE INVENTION

It is an object of the invention to obviate or mitigate one or more of the above identified disadvantages.

According to a first broad aspect, the invention provides a method of controlling the flow of ABR ATM (available bit rate asynchronous transfer mode) cells in an ATM network wherein a plurality of connections through the ATM network are each guaranteed a MCR (minimum cell rate) including an ABR connection, cells above the ABR connection's MCR being referred to as ABR elastic cells; comprising signalling a CI (congestion indication) and an NI (no increase) to a source of cells on the ABR connection, the signalling being carried out by way of passing along the ABR connection an RM (resource management) cell containing the CI and NI, each switch along the ABR connection in sequence receiving the RM cell containing the CI and NI, having an opportunity to set the values for CI and NI in the RM cell before transmitting on an output port in the switch to the next switch in the ABR connection; wherein the new values of CI and NI are obtained by executing the steps of: determining an estimate of an input ABR elastic cell rate Port_EIR of cells destined for transmission on the particular output port; determining an estimate of an output reservation output at the output port for cells having a higher priority than ABR elastic, HPE_reserve; determining a port elastic allocatable rate Port_EAR as a function of the output port's capacity, and HPE_reserve; determining a local_CI and local_NI for the connection to be zero and zero respectively for the case where port_EIR is less than port_EAR*(1−delta_NI), to be zero and one respectively for the case where port_EIR is greater than port_EAR*(1−delta_NI) and less than Port_ EAR*(1+delta_CI), and to be one and one respectively for the case where port_EIR is greater than port_EAR*(1+delta_CI), when delta_NI is between zero and delta_CI is greater than zero; and determining CI and NI by ORing local_CI with the CI in the RM cell, and by ORing local_NI with the NI in the RM cell respectively.

According to a second broad aspect, the invention provides a method of controlling the flow of low priority packets in a packet network wherein a plurality of connections through the packet network carry packets which are either high priority packets or low priority packets, the method being executed by a switch in a particular connection at which congestion on the switch's output port for the connection may occur, the method comprising the steps of: determining an estimate of an input low priority packet rate for the output port; determining an estimate of an output high priority packet rate at the output port; determining a port low priority allocatable rate as a function of the output port's capacity, and the output high priority packet rate; determining a CI value and an NI value for the connection to be a first predetermined value and a second predetermined value respectively for the case where the input low priority rate is less than the high priority reserved rate by at least first predetermined amount, to be a third predetermined value and a fourth predetermined value respectively for the case where the input low priority rate is greater than the high priority reserved rate by at least a second predetermined amount, and to be a first predetermined value and the fourth predetermined value otherwise; feeding back to the connection's source a control packet containing the CI value and the NI value.

According to a third broad aspect, the invention provides an ATM switch for use in an ATM network comprising: an output port for transmitting packets on a plurality of connections through the ATM network each being guaranteed a MCR (minimum cell rate), the plurality of connections including an ABR connection, cells above the ABR connection's MCR being referred to as ABR elastic cells; wherein ABR traffic congestion control for a particular connection is achieved through modifying a CI parameter and an NI parameter contained in an RM (resource management) cell and sending the RM cell to a source on the particular connection; means for determining an estimate of an input ABR elastic cell rate Port_EIR of cells destined for transmission on the output port; means for determining an estimate of an output reservation at the output port for cells having a higher priority than ABR elastic, HPE_reserve; means for determining a port elastic allocatable rate Port_EAR as a function of the output port's capacity, and HPE_reserve; means for determining a local_CI and local_NI for the connection to be zero and zero respectively for the case where port_EIR is less than port_EAR*(1−delta_NI), to be zero and one respectively for the case where port_EIR is greater than port_EAR*(1−delta_NI) and less than Port_EAR*(1+delta_CI), and to be one and one respectively for the case where port_EIR is greater than port_EAR*(1+delta_CI); and means for determining CI and NI by ORing local_CI with the CI in the RM cell, and by ORing local_NI with the NI in the RM cell respectively.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Introduction to ABR

Figure 1:
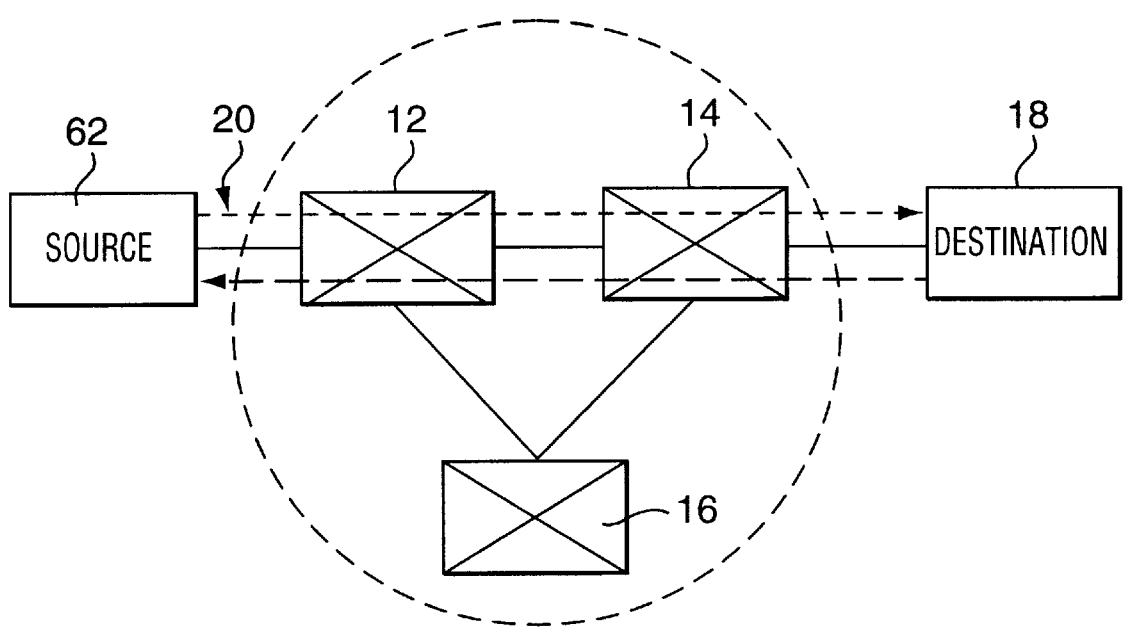
FIG. 1 is a schematic diagram of a simple ATM network.

An example ATM network is shown in FIG. 1 and includes a source 10, a network 11 having a number of switches 12,14,16, and a destination 18. When the source 10 initially decides it needs to communicate with the destination 18, a forward virtual connection is established from the source to the destination and a reverse virtual connection is established from the destination to the source. The virtual connections simply consist of defined routes along which ATM cells will travel through the network 11 in a given direction. An example forward virtual connection is shown by a dotted line 20 and consists of the source 10, switch 12, switch 14, and destination 18 together with links connecting these elements. An example reverse connection is shown by a dotted line 22 and consists of the destination 18, switch 14, switch 12, and source 10, together with links connecting these elements. During the setup of the forward virtual connection 20, the source 10 may request an ICR(initial cell rate) and NRM (number of RM cells). The ICR is the initial cell rate at which the source 10 wants to transmit cells. The NRM determines the frequency with which RM cells are generated. An NRM of 32 for example means that every 32nd cell generated by the source 10 will be an RM cell. There may be some negotiation between the source 10, the switches 12, 14 and destination 18 before agreed upon values for ICR and NRM are established. An ICR and NRM for the reverse connection 22 will be similarly established.

The source 10 may then begin sending cells at the negotiated ICR. Every NRM cells, the source 10 generates an RM cell and transmits the cell towards the destination over the forward connection 20. While the RM cell is travelling to the destination 18 it is referred to as a FRM (forward RM) cell. At the destination 18, the RM cell is turned around and travels from the destination back to the source 10 along the reverse connection 22, and during this time it is referred to as a BRM (backwards RM) cell. The forward connection 20 carries the source's traffic cells, the source's FRM cells, and the destination's BRM cells. The reverse connection 22 carries the source's BRM cells, and the destination's traffic cells and the destination's FRM cells. Of course, "source" and "destination" are just logical roles associated with an end-system. In fact, a particular end-system can be either a source, a destination or both.

The remaining discussion will deal specifically with source 10 generated traffic and RM cells. These will include source 10→destination 18 traffic cells, the source's FRM cells, and the source's BRM.

Each switch can update the CI/NI parameters in an RM cell which passes through it. There are different approaches to the update of CI/NI. It may be done on the forward connection 20, to the FRM cell, or on the reverse connection 22 to the BRM cell.

When the source 10 receives the BRM cell, it reads the CI/NI parameters in the BRM cell and adjusts its ACR (allowed cell rate) according to a standardized algorithm discussed below. The ACR is the maximum rate at which the source may send cells and is initially set to equal the ICR. It will then adjust its CCR (current cell rate) if necessary to ensure that it is less than or equal to the ACR. The CCR is the rate at which the source is actually transmitting cells. If the new ACR is below the CCR then the CCR must be decreased. If the new ACR is above the previous CCR, then the CCR may be increased.

Each of the parameters CI and NI are binary parameters having either a "0" or a "1" value. The manner by which ACR is adjusted by the source may be summarized in the following table:

| CI | NI | ACR Adjustment |
|---|---|---|
| 0 | 0 | ACR = ACR + PCR * RIF |
| 0 | 1 | ACR = ACR |
| 1 | X (don't care) | ACR = ACR − ACR * RDF |

In the above table, PCR is a peak cell rate, RIF is a rate increase factor, and RDF is a rate decrease factor. PCR is the maximum allowable instantaneous cell rate. The adjustments are made subject to the constraints that ACR can not be set lower than the MCR (minimum cell rate) for a connection, and it cannot be set larger than the PCR for the connection. Thus, it can be seen that when CI and NI are both zero the ACR is increased, when CI is zero and NI is one the ACR is left as it is, and when CI is one the ACR is decreased. The CCR may be set to the value indicated in the ACR adjustment or to some smaller value if the source has some reason for doing so.

RM cells are generated on a per ABR connection basis. An ATM switch may have a plurality of input ports and a plurality of output ports. Each input port receives ingress cells, possibly including ABR traffic and RM cells from a number of connections. The switch routes the ingress cells from all of the input ports to the appropriate output ports where they exit the switch as egress cells. It is important that the traffic being routed to a particular output port does not exceed that output port's capacity for extended periods of time.

Each port has a fixed output capacity. At any instant in time, portions of this capacity must be allocated to various traffic classes including for example VBR, CBR and ABR. Each virtual connection of any type including ADR is always guaranteed its MCR. For each port, high priority traffic such as VBR and CBR is serviced first. The MCR for ABR connections may be also considered part of the high priority traffic to be serviced by the port. Any traffic on an ABR connection above and beyond the connection's MCR is lower priority traffic, or "ABR elastic traffic". Traffic which is higher priority than ABR will be referred to as HP traffic, while traffic which is higher priority than ABR elastic will be referred to as HPE traffic. HP traffic is a subset of HPE traffic.

ABR Bandwidth Allocation Using CI/NI

After all the high priority traffic has been accounted for, the port's remaining bandwidth or a portion thereof may be allocated to low priority traffic. It is in the course of allocating the remaining bandwidth to each virtual connection that the switch updates the CI/NI parameters in RM cells.

In what follows, Port_EAR is the port elastic allocatable rate, which represents the total bandwidth that can be offered to all ABR connections on a given port over and above their MCR. More generally, Port_EAR may be referred to as the port's low priority allocatable rate since it defines the bandwidth available for low priority cells. It is based on the amount of bandwidth that is being used by the higher priority (than ABR elastic) traffic.

Figure 2:
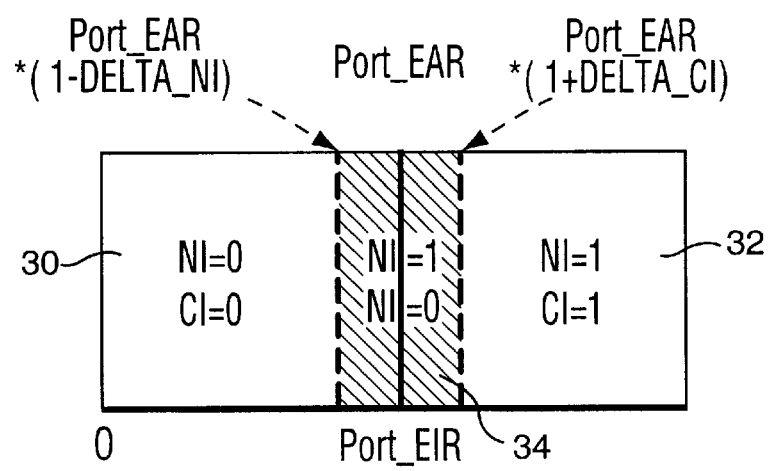
FIG. 2 is a plot showing how CI/NI are determined according to an embodiment of the invention.

In FIG. 2, Port_EIR is plotted along the horizontal axis. The ATM network has feedback control over Port_EIR. Port_EIR can be increased or decreased by appropriately setting CI and NI. The ATM network does not have any control over Port_EAR, this value being determined by the quantity of higher priority traffic and the bandwidth of the port. A goal of the CI/NI is to make the measured Port_EIR converge towards and follow Port_EAR, that is to say, to make the actual input ABR elastic rate approach the allocatable rate. There are three Port_EIR zones which result in setting CI/NI to 0/0, 0/1, and 1/1, which in turn result in the ACR being increased, left the same, and decreased respectively. In the increase zone 30, which consists of Port_EIR values below Port_EAR*(1−delta_NI), to attempt to make the Port_EIR approach Port_EAR CI/NI are set to 0/0, while in the decrease zone 32 which consists of Port_EIR values above Port_EAR*(1+delta_CI), to make Port_EIR approach Port_EAR CI/NI are set to 1/1. Between the increase zone 30 and the decrease zone 32 is a stay zone 34. When Port_EIR is in this zone it is sufficiently close to Port_EAR that CI/NI are set to 0/1 indicating that the ACR at the source does does not need to be changed.

It is noted that the method requires an estimate of the input ABR cell rate and an estimate of the output HP (higher priority) cell rate as described further below. These are determined using an EWMA (exponentially weighted moving average) of interarrival times of ABR cells and interdeparture times of HP cells respectively. In an EWMA, an average of a variable x (average_x) is updated every time a new x value (new_x) arrives according to the equation:

average_x=alpha*average_x+(1−alpha)*new_x where alpha is an EWMA parameter which is between zero and one. It can be seen that by decreasing or increasing alpha, a relatively larger or smaller weight is given to new_x respectively. An advantage of this method of determining an average is that measured rates are smoothed, and oscillations minimized. By determining average inter-cell times, the corresponding average cell rate can be determined by taking the reciprocal of the average inter-cell times.

Pseudo-code and dataflow diagrams for the various method steps will now be described with reference to FIGS. 3 to 8. In the pseudo-code, "pid" stands for "port identifier", and all values with a "[pid]" qualifier are per port values. Furthermore, "icn" stands for "internal connection number" and all values with an "[icn]" qualifier are per connection values. The icn is a number assigned in each switch which is used internal to that switch to identify a particular VC. Of course in the case that there is only a single port, there would be no need for the [pid] qualifier.

Figure 3:
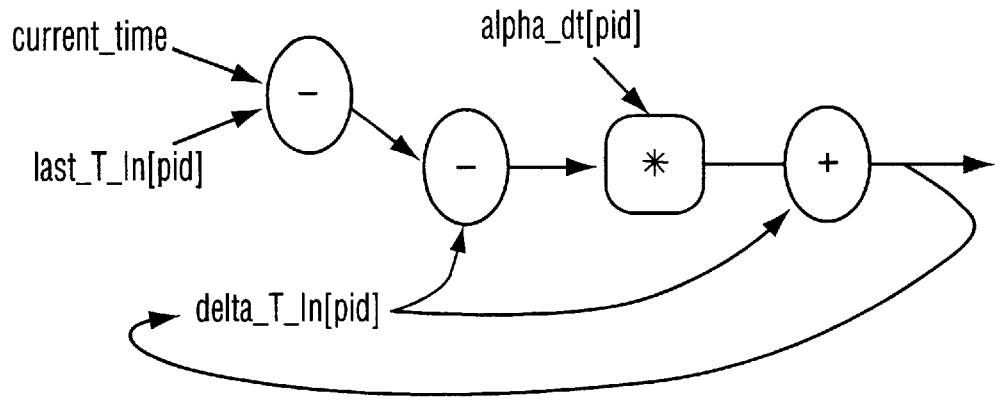
FIG. 3 is an ingress measurements data flow diagram.

FIG. 3 is a data flow diagram for ingress measurements. These ingress measurements determine an average time between ABR cell arrivals on an EWMA basis as described above, and also increment the count of the number of ABR cells in the queue. The pseudo-code for the ingress measurements is as follows, this being executed every time a cell arrives which needs to be output at the port:

```
1    If (my_abr_cell)
2        Qsize[pid] = Qsize[pid] + 1
3        delta_T_In[pid] = alpha_dt[pid] * (current_time
                - last_T_in[pid]) + (1 -alpha_dt[pid])
                * delta_T_In[pid]
4        last_T_in[pid] = current_time
```

In the above, in line 1, my_abr_cell is TRUE if the incoming cell is an ABR cell and is FALSE if the incoming cell is any other type of cell. In line 2, Qsize is a variable which tracks the number of ABR cells queued for departure from on the port. Each time an ABR cell is input to the port, this variable is incremented by one. In line 3, an EWMA is updated for an average ABR cell inter-arrival time delta_T_In. The variable current_time is the current system time. The variable last_T_in was the system time that the previous ABR cell arrived. Finally, alpha_dt is the EWMA weighting parameter for averaging delta_T_In.

Figure 4:
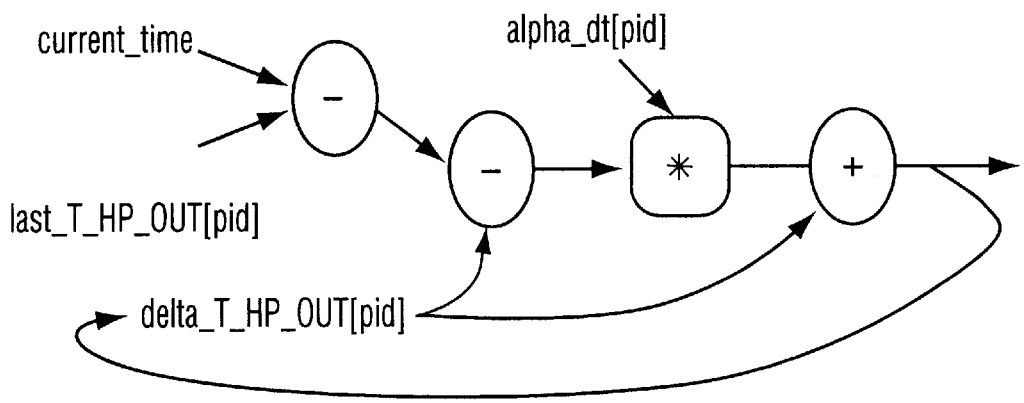
FIG. 4 is an egress measurements data flow diagram.

FIG. 4 is a data flow diagram for egress measurements. These egress measurements determine an average time between HP cell departures on an EMMA basis as described above, and also decrement the count of the number of ABR cells in the queue. The pseudo-code for the egress measurements is as follows, this being executed every time a cell departs from the port:

```
1    If (my_abr_cell)
2        Qsize[pid] = Qsize[pid] - 1
3        if (higher priority than ABR)
4            delta_T_HP_Out[pid] = alpha_dt[pid] *
                (current_time - last_T_HP_Out[pid]) + (1 -
                alpha_dt[pid]) * delta_T_HP_Out[pid]
5            last_T_HP_Out[pid] = current_time
```

In the above, in line 1, my_abr_cell is TRUE if the outgoing cell is an ABR cell and is FALSE if the outgoing cell is any other type of cell. In line 2, Qsize is the previously identified variable which tracks the number of APR cells queued for departure from the port. Each time an ABR cell is output by the port, this variable is decremented by one. In line 3, a test is conducted for whether the cell is a higher priority cell than ABR. This includes all higher priority traffic for VBR and CBR services for example. In line 4, an EWMA is updated for an average HP cell inter-departure time delta_T_HP_Out. The variable current_time is the current system time. The variable last_T_HP_Out was the system time that the previous HP cell departed. Finally, alpha_dt is the EWMA parameter for averaging delta_T_HP_Out.

It is noted that in the data flow diagrams of FIG. 3 and FIG. 4, the EWMA equation has been implemented in the following form:

average_x=alpha*(average_x−new_x)+new_x to minimize the number of multiplications required.

FIGS. 5–8 are data flow diagrams for the computation of CI/NI. The pseudo-code for an CI/NI calculation is as follows, this being executed every time a BRM cell is received by the switch.

```
1   HP_Out_Rate = 1/delta_T_HP_Out[pid]
2   PSF = QSF_Calc(Qsize,Qthr[pid])
3   Port_EAR = max{min_port_EAR, Link_Speed[pid] *TU[pid] -
total_ABR_MCR[pid] - additional_GCR[pid] - HP_Out_Rate} * PSF
4   Port_EIR = 1/delta_T_In[pid] - total_ABR_MCR[pid]
5   IF (Port_EIR < (1 - delta_NI[pid])*Port_EAR)
         local_NI = 0
    ELSE
         local_NI = 1
6   IF (Port_EIR > (1 + delta_CI[pid]) * Port_EAR)
         local_CI = 1
    ELSE
         local_CI = 0
7   CI = local_CI OR cell_CI
8   NI = local_NI OR cell_NI
```

In line 1, the average HP cell output rate HP_Out_Rate is calculated by taking the reciprocal of the average cell interdeparture time, delta_T_HP_Out.

In line 2, PSF (port scaling factor) is computed as a function of the current queue size Qsize, and a per port queue fill threshold Qthr.

In line 3, the per port elastic allocatable rate Port_EAR is computed. First, the total desired output traffic is determined according to Link_Speed[pid]*TU[pid] where Link_Speed is the output traffic capacity of the port, and TU is the target utilization of the port. From this value, bandwidth components which are to be reserved so as to not be included in Port_EAR are subtracted. The components to be substracted may be lumped together as a quantity HPE_reserve (bandwith reserved for higher priority that ABR elastic) and include any measurable output rates of cells having a higher priority then ABR, and will also include an allocation for ABR MCR traffic which of course has a higher priority than ABR elastic.

More specifically, in the pseudo-code HPE_reserve is not specifically included by name, but rather is shown to include a component HP_Out_Rate allocated for measured traffic having a higher priority than ABR, the quantity total_ADR_MCR which is the sum of the MCRs for all ABR connections, and a component additional_GCR which is an allocation of any additional bandwidth a traffic designer may wish to reserve. This additional_GCR component provides an additional mechanism for reserving port bandwidth that is not allowed to contribute to Port_EAR. In the data flow diagram, the quantity total_MCR includes both total_ABR_MCR and additional_GCR. The amount Link_Speed[pid]*TU[pid]−total_ABR_MCR[pid]−additional_GCR[pid]−HP_Out_Rate is the nominal bandwidth available for elastic ABR traffic on the port. A minimum value of min_port_EAR[pid] may be imposed on a per port basis. The nominal value is then multiplied by the PSF (port scaling factor). The PSF is a value between 0 and 1 which can scale back Port_EAR. It may be computed as a function of the current number of ABR cells queued for departure from the port and a corresponding maximum queue size threshold. The purpose of the PSF is to take the number of cells queued into account and to reduce Port_EAR when this number is near the maximum queue size threshold so as to avoid queue overload.

In line 4, the per port elastic input rate Port_EIR is determined by taking the reciprocal of the ABR cell inter-arrival time delta_T_In[pid] and subtracting total_ABR_MCR[pid] which is the sum of all the port's ABR connection's MCRs.

In lines 5–6 local values for CI/NI, local_CI/local_NI are set in accordance with the algorithm discussed previously with reference to FIG. 2. These are the CI/NI values determined for the connection by the port, independent of other CI/NI values determined at the destination or other switches.

In line 7, the local value for CI, local_CI is "ORed" with the CI which was in the incoming BRM cell, cell_CI to produce the outgoing CI value.

In line 8, the local value for NI, local_NI is "ORed" with the NI which was in the incoming BRM cell, cell_NI to produce the outgoing NI value.

Figure 5:
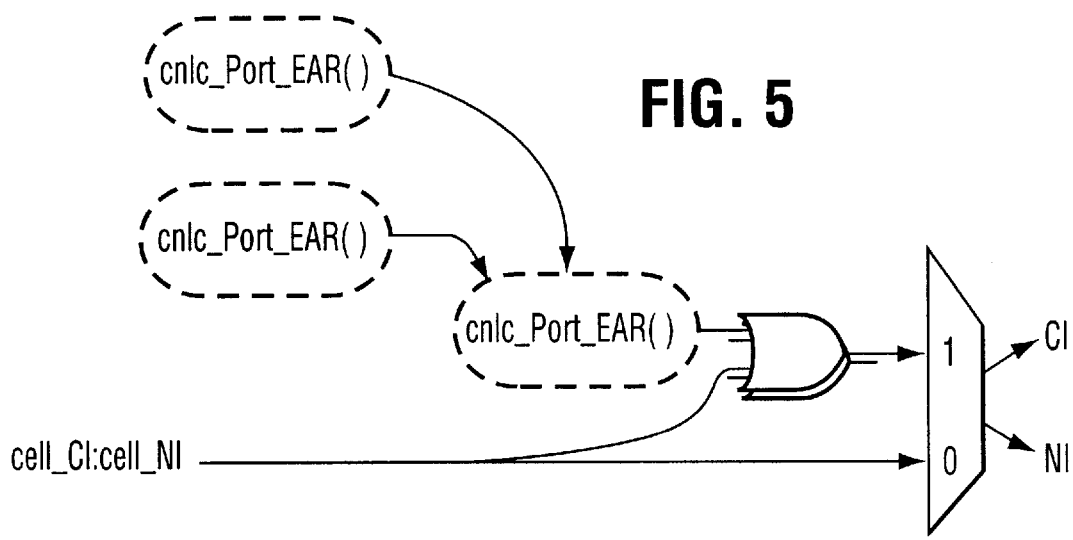
FIGS. 5–8 are data flow diagrams for the determination of CI/NI according to an embodiment of the invention.

A top level data flow diagram for the calculation of CI/NI is shown in FIG. 5. The steps involved with the calculation of local_CI and local_NI have been lumped together as calc_local_CI_NI. The steps involved with the calculation Port_EAR have been lumped together as calc_Port_EAR. The steps involved with the calculation of Port_EIR have been lumped together as calc_Port_EIR.

Figure 6:
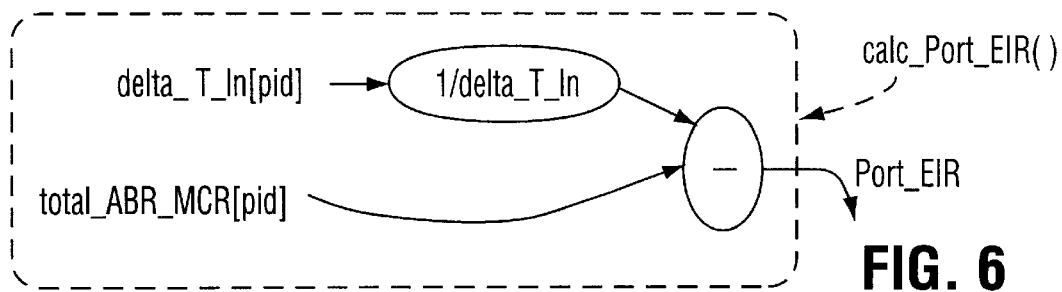
Figure 7:
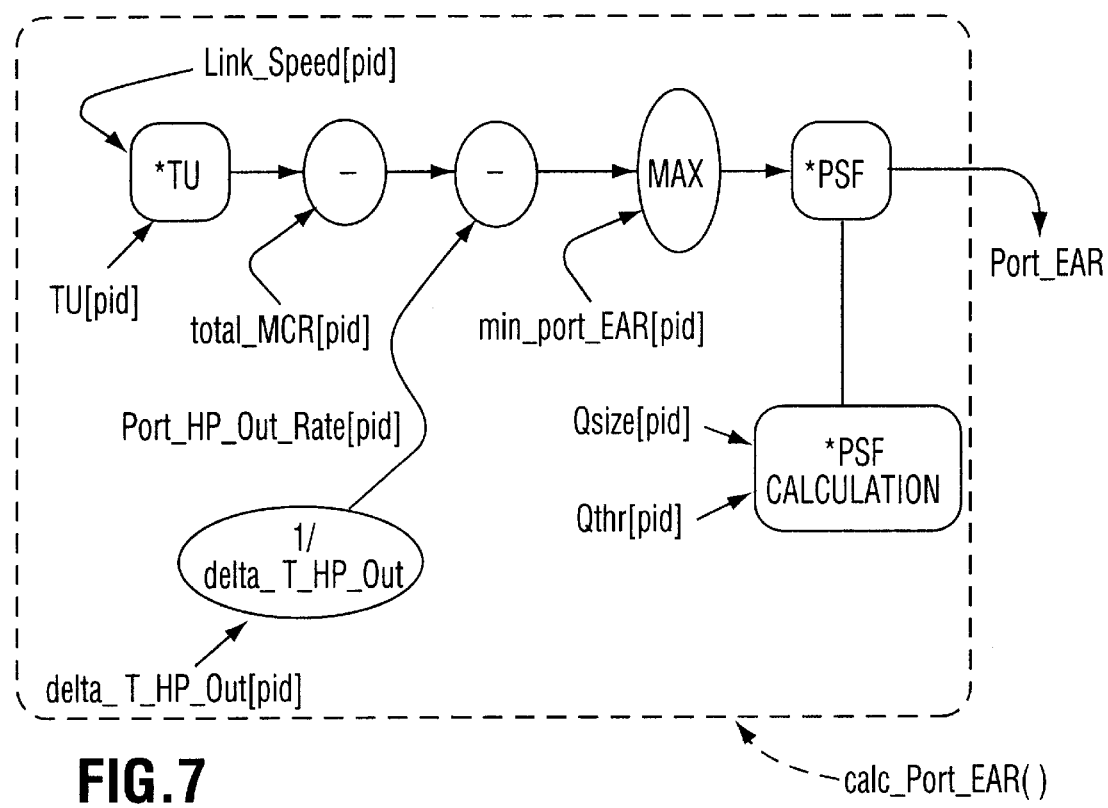
Figure 8:
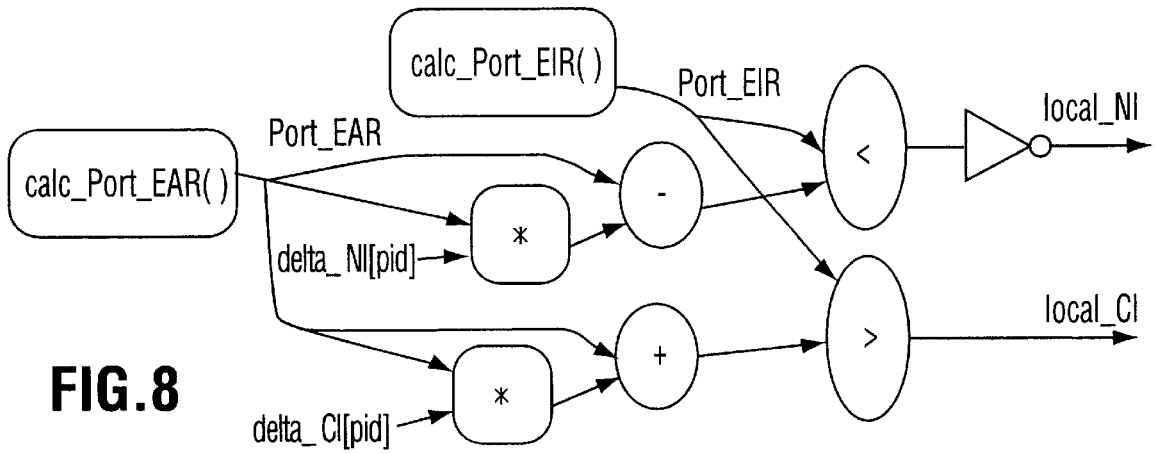

A data flow diagram for the calculation Port_EIR is shown in FIG. 6 and a data flow diagram for the calculation of Port_EAR is shown in FIG. 7. Finally, a data flow diagram for the calculation of local_CI and local_NI is shown in FIG. 8.

Numerous modifications and variations of the present invention are possible in light of the above teachings. It is therefore to be understood that within the scope of the appended claims, the invention may be practised otherwise than as specifically described herein.

In the illustrated embodiment, the feedback of CI/NI has been assumed to be achieved through the use of RM cells. RM cells have a structure which is defined by various ATM standards bodies. More generally, if adhering to these standards is not an issue, the CI/NI may be fed back to the source in an ATM connection in control cells having an arbitrary structure.

In the illustrated embodiment, the network upon which flow control is to be implemented is an ATM network. Alternatively, it may be any other type of network which is packet based and which includes high priority and low priority traffic classes.

We claim:

1. A method of controlling the flow of ABR ATM (available bit rate asynchronous transfer mode) cells in an ATM network wherein a plurality of connections through the ATM network are each guaranteed a MCR (minimum cell rate) including an ABR connection, cells above the ABR connection's MCR being referred to as ABR elastic cells; comprising signalling a CI (congestion indication) and an NI (no increase) to a source of cells on the ABR connection, the signalling being carried out by way of passing along the ABR connection an RM (resource management) cell containing the Ci and NI, each switch along the ABR connection in sequence receiving the RM cell containing the CI and NI, having an opportunity to set the values for CI and NI in the RM cell before transmitting on an output port in the switch to the next switch in the ABR connection; wherein the new values of CI and NI are obtained by executing the steps of:

determining an estimate of an input ABR elastic cell rate Port_EIR of cells destined for transmission on the particular output port;

determining an estimate of an output reservation output at the output port for cells having a higher priority than ABR elastic, HPE_reserve;

determining a port elastic allocatable rate Port_EAR as a function of the output port's capacity, and HPE_reserve;

determining a local_CI and local_NI for the connection to be zero and zero respectively for the case where port_EIR is less than port_EAR*(1−delta_NI), to be zero and one respectively for the case where port_EIR is greater than port_EAR*(1−delta_NI) and less than Port_EAR*(1+delta_CI), and to be one and one respectively for the case where port_EIR is greater than port_EAR*(1+delta_CI), when delta_NI is between zero and delta_CI is greater than zero; and determining CI and NI by ORing local_CI with the CI in the RM cell, and by ORing local_NI with the NI in the RM cell respectively.

2. A method according to claim 1 wherein the port elastic allocatable rate Port_EAR is determined according to Port_EAR=(output port's capacity)*(target utilization of port)−HPE_reserve.

3. A method according to claim 2 wherein HPE_reserve is determined according to HPE_reserve=HP_Out_Rate+Total_ABR_MCR, HP_Out_Rate being a rate of output at the output port of cells having a higher priority than ABR, and Total_ABR_MCR being the sum of all the ABR connection's MCRs.

4. A method according to claim 2 wherein HPE_reserve is determined according to HPE_reserve=HP_Out_Rate+Total_ABR_MCR+additional_GCR, HP_Out_Rate being a rate of output at the output port of cells having a higher priority than ABR, Total_ADR_MCR being the sum of all the ABR connection's MCRs, and additional_GCR being an additional bandwidth component which is to be excluded from Port_EAR.

5. A method according to claim 3 wherein an estimate of the HP_Out_Rate is determined by averaging inter-departure times of cells having a higher priority than APR, and by inverting this inter-departure time average.

6. A method according to claim 5 wherein the estimate of Port_EIR is determined by averaging inter-arrival times of ABR cells, inverting this inter-arrival time average to get an ABR cell arrival rate, and subtracting from the ABR cell arrival rate the sum of the MCRs for all of the ABR connections on the port.

7. A method according to claim 6 wherein the averaging of the ABR cell inter-arrival times and of the high priority cell inter-departure times is done using an exponentially weighted moving average.

8. A method of controlling the flow of low priority packets in a packet network wherein a plurality of connections through the packet network carry packets which are either high priority packets or low priority packets, the method being executed by a switch in a particular connection at which congestion on the switch's output port for the connection may occur, the method comprising the steps of:

determining an estimate of an input low priority packet rate for the output port;

determining an estimate of an output high priority packet rate at the output port;

determining a port low priority allocatable rate as a function of the output port's capacity, and the output high priority packet rate;

determining a CI value and an NI value for the connection to be a first predetermined value and a second predetermined value respectively for the case where the input low priority rate is less than the high priority reserved rate by at least first predetermined amount, to be a third predetermined value and a fourth predetermined value respectively for the case where the input low priority rate is greater than the high priority reserved rate by at least a second predetermined amount, and to be a first predetermined value and the fourth predetermined value otherwise;

feeding back to the connection's source a control packet containing the CI value and the NI value.

9. A method according to claim 8 wherein the estimate of the input lower priority packet rate is determined by averaging inter-arrival times of lower priority packets, and the estimate of the higher priority reserved rate is determined by averaging inter-departure times of higher priority packets.

10. A method according to claim 9 wherein the averaging of the low priority packet inter-arrival times and of the high priority packet inter-departure times is done using an exponentially weighted moving average.

11. An ATM switch for use in an ATM network comprising:

an output port for transmitting packets on a plurality of connections through the ATM network each being guaranteed a MCR (minimum cell rate), the plurality of connections including an ABR connection, cells above the ABR connection's MCR being referred to as ABR elastic cells; wherein ABR traffic congestion control for a particular connection is achieved through modifying a CI parameter and an NI parameter contained in an RM (resource management) cell and sending the RM cell to a source on the particular connection;

means for determining an estimate of an input ABR elastic cell rate Port_EIR of cells destined for transmission on the output port;

means for determining an estimate of an output reservation at the output port for cells having a higher priority than ABR elastic, HPE_reserve;

means for determining a port elastic allocatable rate Port_EAR as a function of the output port's capacity, and HPE_reserve;

means for determining a local_CI and local_NI for the connection to be zero and zero respectively for the case where port_EIR is less than port_EAR*(1−delta_NI), to be zero and one respectively for the case where port_EIR is greater than port_EAR*(1−delta_NI) and less than Port_EAR*(1+delta_CI), and to be one and one respectively for the case where port_EIR is greater than port_EAR*(1+delta_CI); and means for determining CI and NI by ORing local_CI with the CI in the RM cell, and by ORing local_NI with the NI in the RM cell respectively.

12. An ATM switch according to claim 11 wherein the port elastic allocatable rate Port_EAR is determined according to Port_EAR=(output port's capacity)*(target utilization of port)−HPE_reserve.

13. An ATM switch according to claim 11 wherein HPE_reserve is determined according to HPE_reserve=HP_Out_Rate+Total_ABR_MCR, HP_Out_Rate being a rate of output at the output port of cells having a higher priority than ABR, and Total_ABR_MCR being the sum of all the ABR connection's MCRs.

14. An ATM switch according to claim 11 wherein HPE_reserve is determined according to HPE_reserve=HP_Out_Rate+Total_ABR_MCR+additional_GCR, HP_Out_Rate being a rate of output at the output port of cells having a higher priority than ABR, Total_ABR_MCR being the sum of all the ABR connection's MCRs, and additional_GCR being an additional bandwidth component which is to be excluded from Port_EAR.

15. An ATM switch according to claim 11 wherein an estimate of the HP_Out_Rate is determined by averaging inter-departure times of cells having a higher priority than ABR, and by inverting this inter-departure time average.

16. An ATM switch according to claim 11 wherein the estimate of Port_EIR is determined by averaging inter-arrival times of ABR cells, inverting this inter-arrival time average to get an ABR cell arrival rate, and subtracting from the ABR cell arrival rate the sum of the MCRs for all of the ABR connections on the port.

17. An ATM switch according to claim 16 wherein the averaging of the ABR cell inter-arrival times and of the high priority cell inter-departure times is done using an exponentially weighted moving average.

* * * * *